(12) United States Patent
Wang et al.

(10) Patent No.: US 11,924,838 B2
(45) Date of Patent: Mar. 5, 2024

(54) LONG UPLINK BURST CHANNEL DESIGN

(71) Applicant: QUALCOMM Incorporated, San Diego, CA (US)

(72) Inventors: Renqiu Wang, San Diego, CA (US); Yi Huang, San Diego, CA (US); Peter Gaal, San Diego, CA (US); Juan Montojo, San Diego, CA (US); Tao Luo, San Diego, CA (US); Sony Akkarakaran, Poway, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/014,769

(22) Filed: Sep. 8, 2020

(65) Prior Publication Data

US 2020/0404654 A1 Dec. 24, 2020

Related U.S. Application Data

(63) Continuation of application No. 15/985,232, filed on May 21, 2018, now abandoned.
(Continued)

(51) Int. Cl.
*H04W 72/21* (2023.01)
*H04B 1/713* (2011.01)
(Continued)

(52) U.S. Cl.
CPC ............ *H04W 72/21* (2023.01); *H04B 1/713* (2013.01); *H04L 1/1858* (2013.01);
(Continued)

(58) Field of Classification Search
USPC ....................................................... 370/329
See application file for complete search history.

(56) References Cited

U.S. PATENT DOCUMENTS 9,191,930 B2 * 11/2015 Papasakellariou .... H04L 5/0055
10,389,496 B2   8/2019 Hwang et al.
(Continued)

FOREIGN PATENT DOCUMENTS

CN      105827371 A    8/2016
EP       3076577 A1   10/2016
(Continued)

OTHER PUBLICATIONS

R1-1710315, Design of long NR-PUCCH for up to 2 UCI bits, uploaded on Jun. 17, 2017 (Year: 2017).*
(Continued)

*Primary Examiner* — Jeffrey M Rutkowski
*Assistant Examiner* — Luna Weissberger
(74) *Attorney, Agent, or Firm* — Patterson & Sheridan, L.L.P/Qualcomm Incorporated

(57) ABSTRACT

Certain aspects of the present disclosure relate to methods and apparatus relating to a long uplink burst channel design. In certain aspects, the method includes determining, based on a hopping pattern, a first set of frequency resources available for transmitting uplink control information (UCI) within a first portion of a transmission time interval (TTI) and a second set of frequency resources available for transmitting UCI within a second portion of the TTI. The method also includes transmitting the UCI using the determined first set of frequency resources and the second set of frequency resources.

24 Claims, 12 Drawing Sheets

Related U.S. Application Data

(60) Provisional application No. 62/524,206, filed on Jun. 23, 2017.

(51) Int. Cl.
  *H04L 1/1829* (2023.01)
  *H04L 5/00* (2006.01)
  *H04L 27/20* (2006.01)
  *H04W 72/0446* (2023.01)
  *H04W 72/0453* (2023.01)

(52) U.S. Cl.
  CPC .......... *H04L 1/1861* (2013.01); *H04L 5/0012* (2013.01); *H04L 5/0026* (2013.01); *H04L 5/0048* (2013.01); *H04L 5/0055* (2013.01); *H04L 5/001* (2013.01); *H04L 5/0091* (2013.01); *H04L 27/2035* (2013.01); *H04L 27/2042* (2013.01); *H04W 72/0446* (2013.01); *H04W 72/0453* (2013.01)

(56) References Cited

U.S. PATENT DOCUMENTS

| | | | |
|---|---|---|---|
| 2012/0057449 | A1 | 3/2012 | Takaoka et al. |
| 2012/0087286 | A1 | 4/2012 | Kim et al. |
| 2015/0244415 | A1 | 8/2015 | Shudark et al. |
| 2017/0013612 | A1 | 1/2017 | Nayeb Nazar et al. |
| 2018/0227949 | A1* | 8/2018 | Tiirola ................ H04W 74/04 |
| 2018/0376473 | A1 | 12/2018 | Wang et al. |
| 2019/0141696 | A1* | 5/2019 | Kim .................... H04L 5/0055 |
| 2019/0222254 | A1 | 7/2019 | Kim et al. |
| 2020/0059332 | A1 | 2/2020 | Takeda et al. |
| 2020/0092876 | A1* | 3/2020 | Cho .................... H04W 72/21 |
| 2020/0100240 | A1 | 3/2020 | Takeda et al. |
| 2020/0112410 | A1 | 4/2020 | Takeda et al. |

FOREIGN PATENT DOCUMENTS

| | | | |
|---|---|---|---|
| EP | 3471321 | A1 | 4/2019 |
| JP | 2019528597 | A | 10/2019 |
| KR | 20180135859 | A | 12/2018 |
| TW | 201440564 | A | 10/2014 |
| WO | 2013020279 | A1 | 2/2013 |
| WO | 2017044066 | A1 | 3/2017 |
| WO | 2017130993 | A1 | 8/2017 |
| WO | 2018203396 | A1 | 11/2018 |

OTHER PUBLICATIONS

Apple Inc: "On Channel Design for Long PUCCH," 3GPP Draft; R1-1708282_Channel_Design_for_Long_PUCCH, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017, XP051273475, 4 pages, Retrieved from the Internet: URL: http://www.3gpp.org/ftp/Meetings_3GPP_SYNC/RAN1/Docs/ [retrieved on May 14, 2017].
Ericsson: "On the Design of Long PUCCH for 1-2 bits UCI", 3GPP TSG-RN WG1 #89, 3GPP Draft; R1-1709084, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017, XP051274242, 3 Pages, Retrieved from the Internet: URL: http://www.3gpp.org/ftp/Meetings_3GPP_SYNC/RAN1/Docs/ [retrieved on May 14, 2017].
Huawei, et al., "Evaluation of Long Duration PUCCH Structure," 3GPP Draft; R1-1706955, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 8, 2017, XP051263417, 8 pages, Retrieved from the Internet: URL: http://www.3gpp.org/ftp/tsg_ran/WG1_RL1/TSGR1_89/Docs/ [retrieved on May 8, 2017].
International Search Report and Written Opinion—PCT/US2018/033960—ISA/EPO—dated Mar. 14, 2019.
LG Electronics: "Resource Configuration for Long NR-PUCCH," 3GPP Draft; R1-1704910 Resource Configuration for Long NR-PUCCH, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017, XP051243045, 6 pages, Retrieved from the Internet: URL: http://www.3gpp.org/ftp/Meetings_3GPP_SYNC/RAN1/Docs/ [retrieved on Apr. 2, 2017].
LG Electronics: "Design of Long NR-PUCCH for up to 2 UCI Bits," 3GPP Draft, R1-1710315 Design of Long NR-PUCCH for up to 2 UCI Bits_Final, 3rd Generation Partnership Project (3GPP), Mobile Competence Centre, 650, Route Des Lucioles, F-06921 Sophia-Antipolis Cedex, vol. RAN WG1, No. Qingdao, P.R. China, Jun. 27, 2017-Jun. 30, 2017 Jun. 17, 2017 (Jun. 17, 2017), XP051304946, 7 Pages, Retrieved from the Internet:URL:http://www.3gpp.org/ftp/tsg_ran/WG1_RL1/TSGR1_AH/NR_AH_1706/Docs/ [retrieved on Jun. 17, 2017].
Panasonic: "Discussion on Channel Structure of Long-Duration NR-PUCCH for UCI of up to 2 bits", 3GPP Draft; R1-1710932, 3rd Generation Partnership Project (3GPP), Mobile Competence Centre, 650, Route Des Lucioles, F-06921 Sophia-Antipolis Cedex, France vol. RAN WG1, No. Qingdao, P.R. China, Jun. 27, 2017-Jun. 30, 2017, Jun. 16, 2017 (Jun. 16, 2017), XP051304402, pp. 1-4, Retrieved from the Internet: URL:http://www.3gpp.org/ftp/tsg_ran/WG1_RL1/TSGR1_AH/NR_AH_1706/Docs/ [retrieved on Jun. 16, 2017].
Partial International Search Report—PCT/US2018/033960—ISA/EPO—dated Nov. 27, 2018.
European Search Report—EP20213577—Search Authority—The Hague—dated Apr. 1, 2021.
Taiwan Search Report—TW107117344—TIPO—dated Jun. 18, 2021.
Huawei, et al., "Review Summary for AI 7.3.2.2. PUCCH Structure in Long-Duration", 3GPP TSG RAN WG1 Meeting#91, 3GPP Draft, R1-1721380 AI 7322 Review Summary of Long PUCCH_V3, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, 16 Pages, Nov. 28, 2017 (Nov. 28, 2017), XP051363853, Section 4.
Intel Corporation: "Long PUCCH Design Aspects", 3GPP Draft; R1-1705031 Intel Long PUCCH Design, 3rd Generation Partnership Project (3GPP), Mobile Competence Centre, 650, Route Des Lucioles, F-06921 Sophia-Antipolis Cedex, France, vol. RAN WG1, No. Spokane. USA; Apr. 3, 2017-Apr. 7, 2017 Mar. 25, 2017, XP051251706, Sections 1, 2.1.3, 5 pages.
LG Electronics : "Design of Long NR-PUCCH Format", 3GPP TSG RAN WG1 Meeting #88bis, R1-1704909, Apr. 3-7, 2017, 7 Pages.
Qualcomm Incorporated: "Long PUCCH Design with 1 or 2 Bits UCI Payload", 3GPP TSG RAN WG1 Meeting NR#3, R1-1716759, Nagoya, Japan, Sep. 18-21, 2017, pp. 1-8.
Taiwan Search Report—TW107117344—TIPO—dated Jan. 5, 2022.
Taiwan Search Report—TW107117344—TIPO—dated May 18, 2022.
Huawei., et al., "Long PUCCH Structure for up to 2 Bits with High Multiplexing Capacity", 3GPP TSG RAN WG1 NR Ac Hoc Meeting, R1-1709961, Jun. 27-30, 2017, 5 Pages.
Lenovo., et al., "Long PUCCH Design for UCI of more than 2 Bits", 3GPP TSG RAN WG1 NR Ac-Hoc#2, R1-1710599, Jun. 27-30, 2017, 5 Pages.
NTT Docomo, Inc: "Long-PUCCH for UCI of more than 2 Bits", 3GPP TSG RAN WG1 Meeting #89, R1-1708474, May 15-19, 2017, pp. 1-5.

\* cited by examiner

LONG UPLINK BURST CHANNEL DESIGN

CROSS-REFERENCE TO RELATED APPLICATIONS

This application is continuation of U.S. application Ser. No. 15/985,232, entitled "LONG UPLINK BURST CHANNEL DESIGN," which was filed May 21, 2018, and which claims the benefit of U.S. Provisional Application Ser. No. 62/524,206 entitled "LONG UPLINK BURST CHANNEL DESIGN," which was filed Jun. 23, 2017. Each of the aforementioned applications is herein incorporated by reference in its entirety.

FIELD

The present disclosure relates generally to communication systems, and more particularly, to methods and apparatus relating to a long uplink burst channel design.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a transmitter. The method generally includes determining, based on a hopping pattern, a first set of frequency resources available for transmitting uplink control information (UCI) within a first portion of a transmission time interval (TTI) and a second set of frequency resources available for transmitting UCI within a second portion of the TTI and transmitting the UCI using the determined first set of frequency resources and the second set of frequency resources.

Also described herein are embodiments of an apparatus for wireless communications comprising a non-transitory memory comprising executable instructions and a processor in data communication with the memory and configured to execute the instructions to cause the computer system to determine, based on a hopping pattern, a first set of frequency resources available for transmitting uplink control information (UCI) within a first portion of a transmission time interval (TTI) and a second set of frequency resources available for transmitting UCI within a second portion of the TTI and transmit the UCI using the determined first set of frequency resources and the second set of frequency resources.

Also described herein are embodiments of an apparatus for wireless communications. The apparatus comprising means for determining, based on a hopping pattern, a first set of frequency resources available for transmitting uplink control information (UCI) within a first portion of a transmission time interval (TTI) and a second set of frequency resources available for transmitting UCI within a second portion of the TTI. The apparatus further comprising means for transmitting the UCI using the determined first set of frequency resources and the second set of frequency resources.

Certain aspects provide a method for wireless communications by a user equipment (UE). The method generally includes determining a set of uplink resources for repeated transmission of one or more acknowledgment (ACK) bits across multiple symbols within a transmission time interval (TTI), determining a set of uplink resources for multiplexing at least one type of reference signals (RS) with the ACK bits, and transmitting the ACK bits multiplexed with the RS according to the determined set of uplink resources for repeated transmission of the one or more ACK bits and the determined set of uplink resources for multiplexing the at least one type of RS with the one or more ACK bits.

Also described herein are embodiments of an apparatus for wireless communications comprising a non-transitory memory comprising executable instructions and a processor in data communication with the memory and configured to execute the instructions to cause the computer system to determine a set of uplink resources for repeated transmission of one or more acknowledgment (ACK) bits across multiple symbols within a transmission time interval (TTI), determine a set of uplink resources for multiplexing at least one type of reference signals (RS) with the one or more ACK bits, and transmit the one or more ACK bits multiplexed with the RS according to the determined set of uplink resources for repeated transmission of the one or more ACK bits and the determined set of uplink resources for multiplexing the at least one type of RS with the one or more ACK bits.

Also described herein are embodiments of an apparatus for wireless communications. The apparatus comprises means for determining a set of uplink resources for repeated transmission of one or more acknowledgment (ACK) bits across multiple symbols within a transmission time interval (TTI). The apparatus further comprises means for determining a set of uplink resources for multiplexing at least one type of reference signals (RS) with the one or more ACK bits. The apparatus also comprises means for transmitting the one or more ACK bits multiplexed with the RS according to the determined set of uplink resources for repeated transmission of the one or more ACK bits and the determined set of uplink resources for multiplexing the at least one type of RS with the one or more ACK bits.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
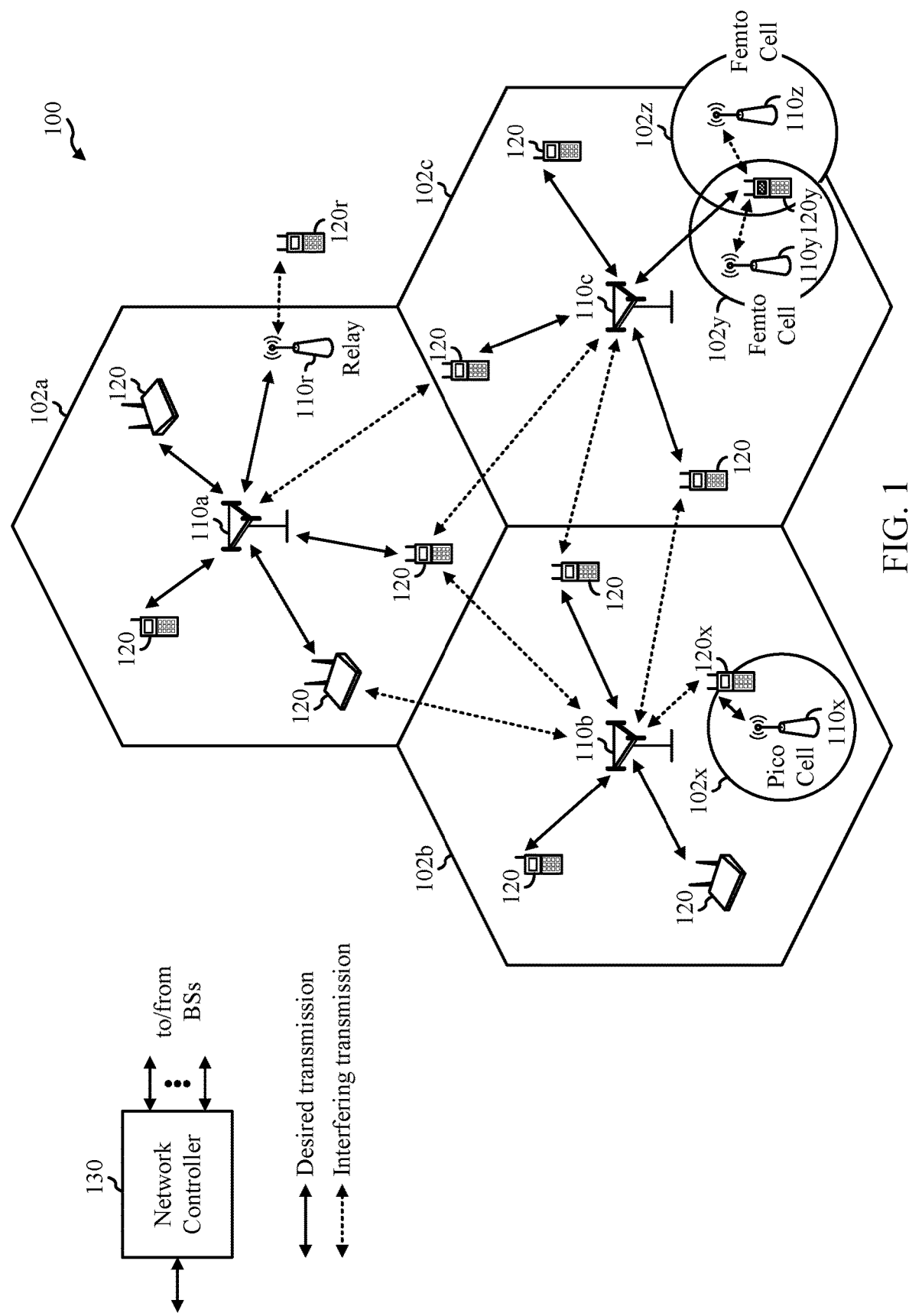
FIG. 1 is a block diagram conceptually illustrating an example telecommunications system, in accordance with certain aspects of the present disclosure.

Aspects of the present disclosure relate to methods and apparatus relating to a long uplink burst channel design.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

In some cases, when transmitting uplink control information (UCI), a wireless device (e.g., UE 120) may perform frequency hopping. Frequency hopping refers to the practice of repeatedly switching frequencies within a frequency band in order to reduce interference and avoid interception. Under certain wireless communications standards, such as NR, the UCI may be transmitted in a long uplink burst channel ("Uplink Long Burst") region of a transmission time interval (TTI). The UCI may include information such as acknowledgment (ACK), channel quality indicator (CQI), or scheduling request (SR) information.

In some cases, under the NR standards, the duration of the Uplink Long Burst channel for UCI transmissions may vary depending on how many symbols are used for the physical downlink control channel (PDCCH), the gap, and the short uplink burst (shown as UL Short Burst) in the TTI. Certain embodiments herein describe frequency hopping techniques for the Uplink Long Burst region of the physical uplink control channel (PUCCH). Also, certain embodiments described herein relate to determining uplink resources in the Uplink Long Burst channel for transmitting one or more ACK bits multiplexed with reference signals.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, UE 120 or BS 110 may perform operations 1000 of FIG. 10. Also, UE 120 may perform operations 1200 of FIG. 12.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
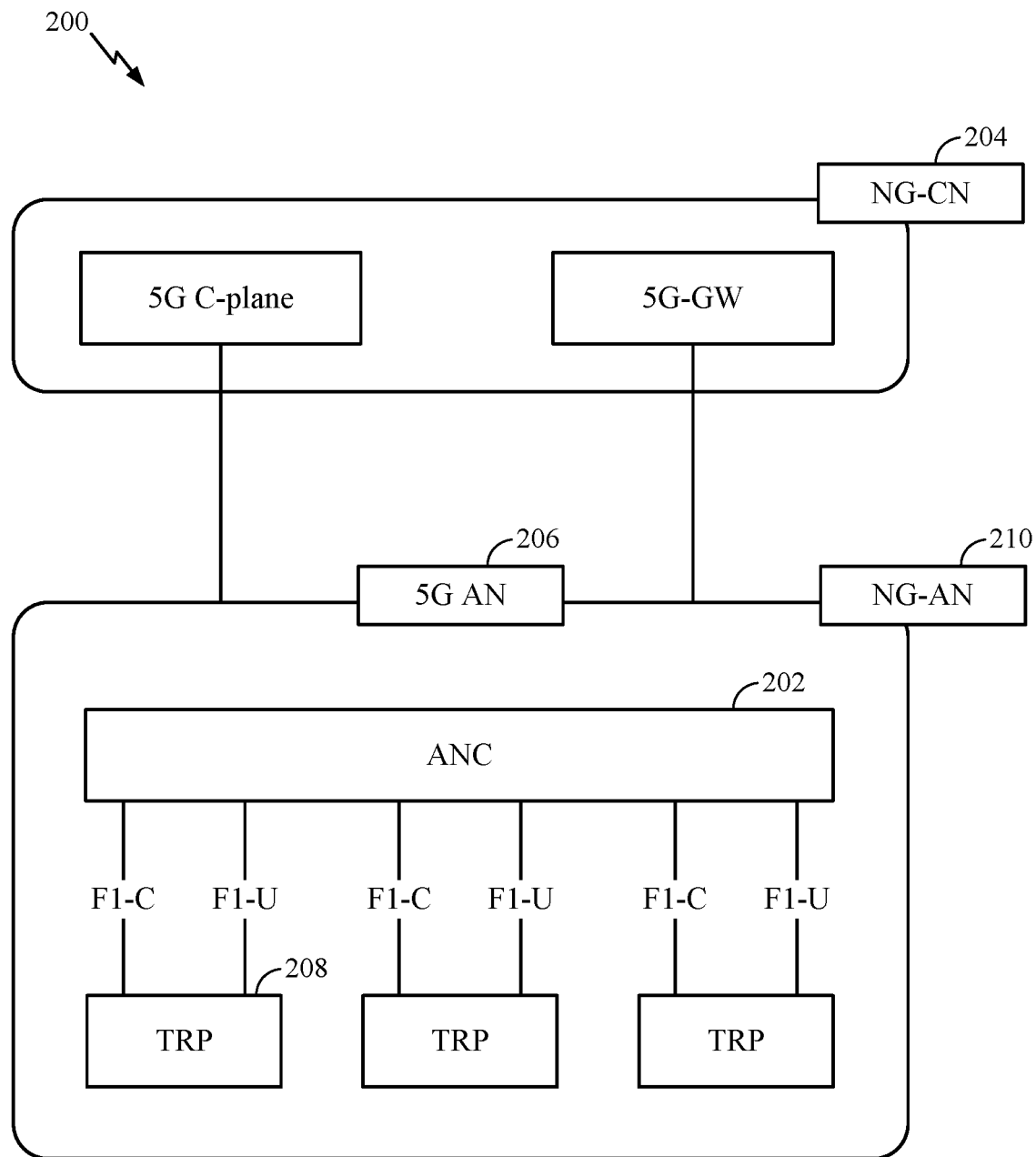
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
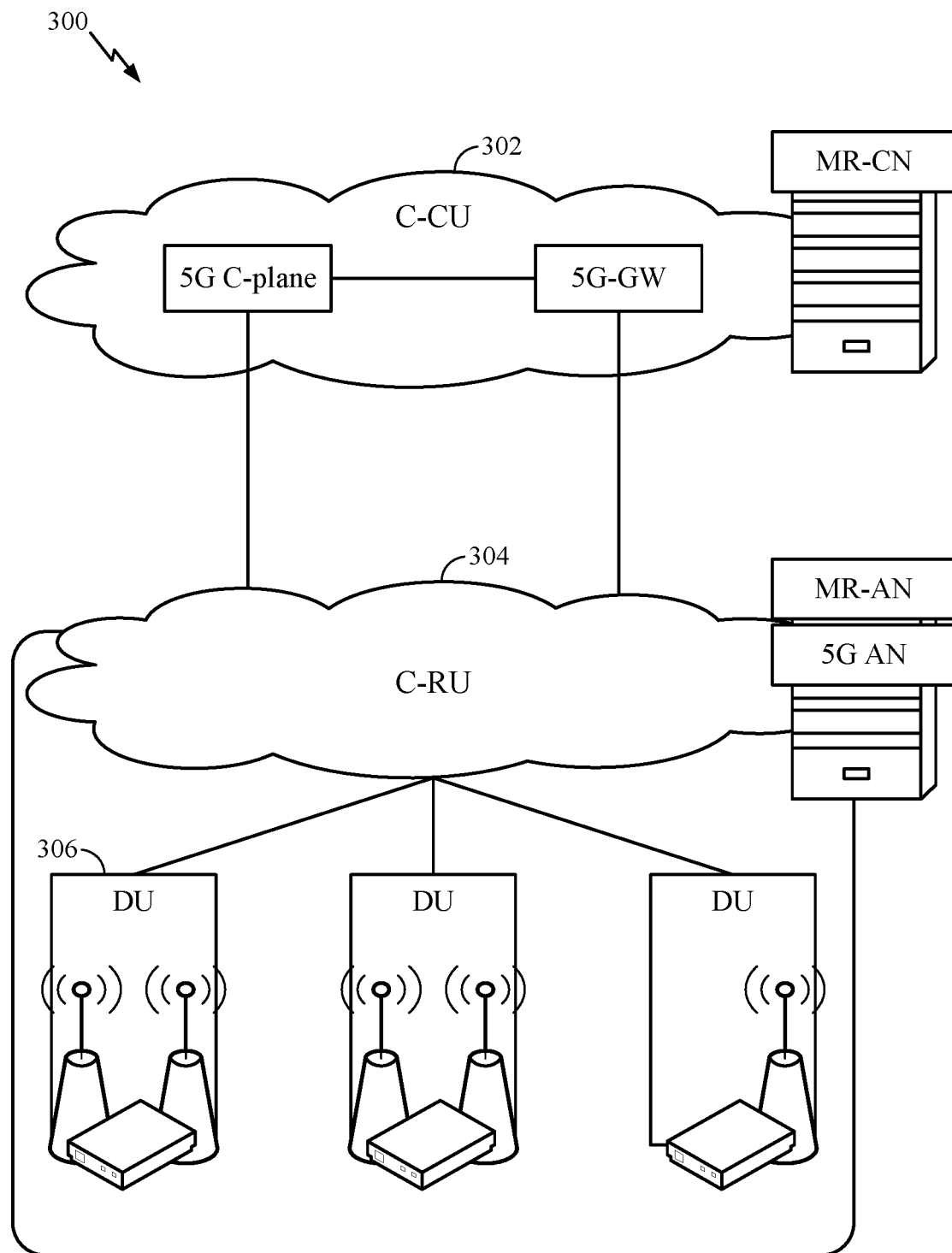
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
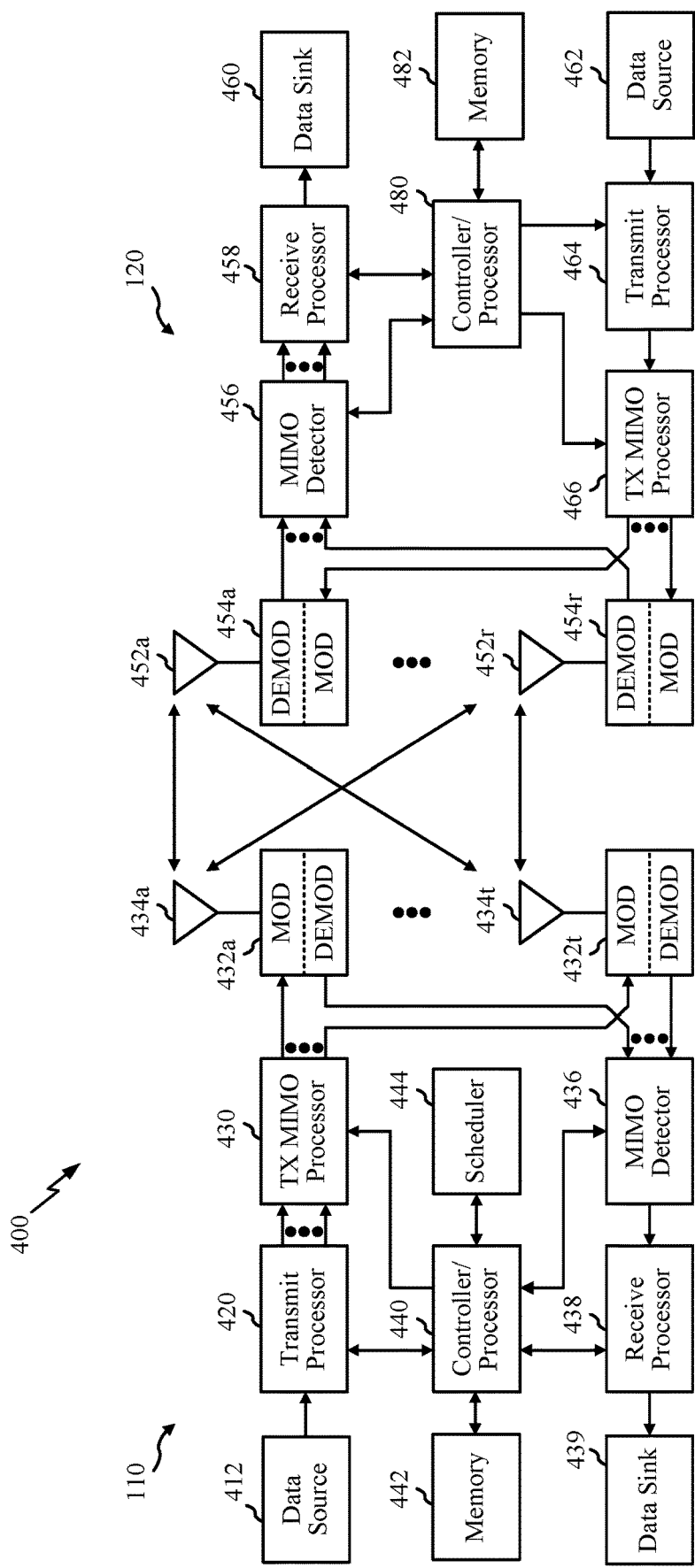
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 10 and 12.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 10 and 12, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
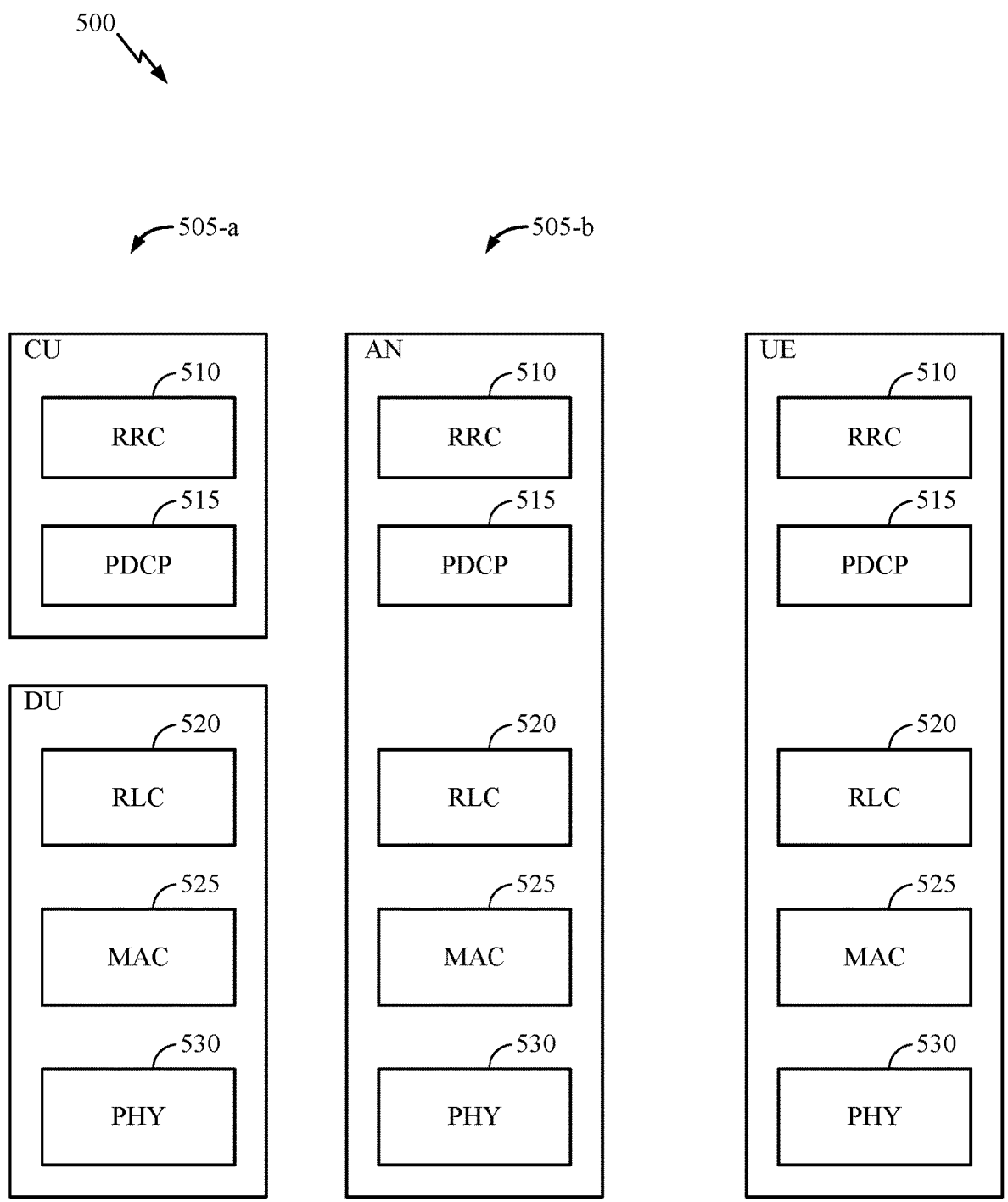
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
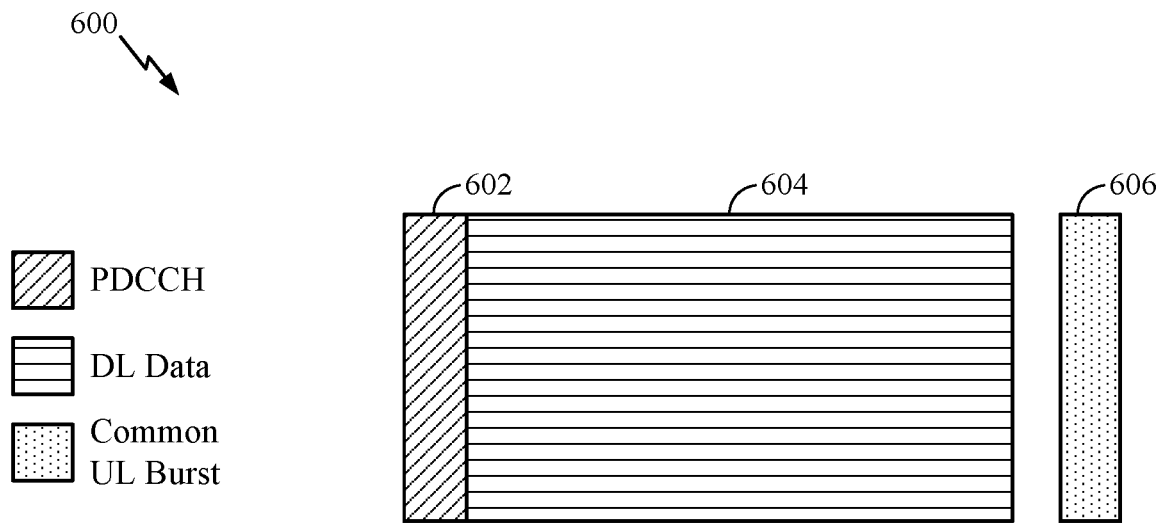
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

Figure 7:
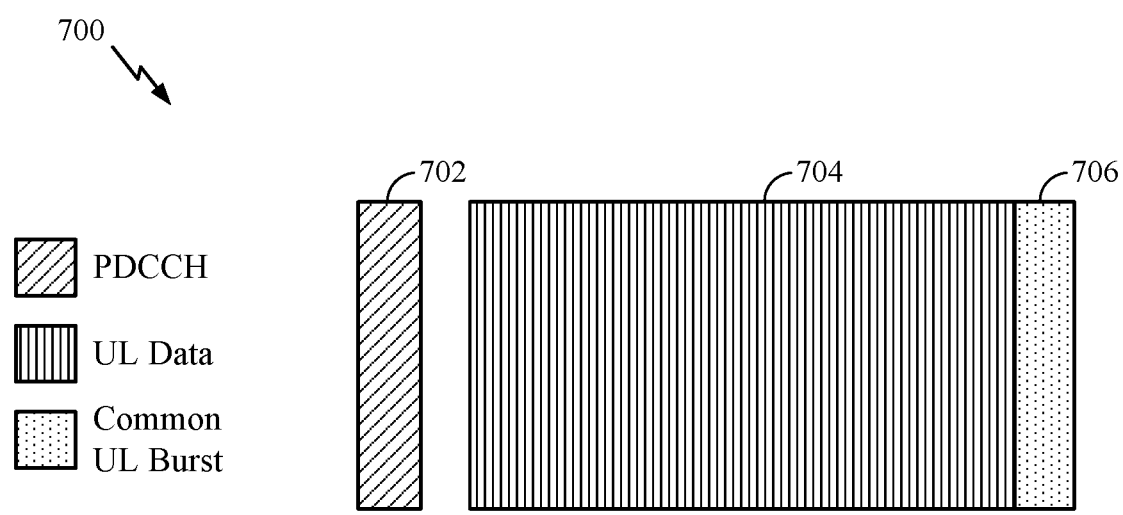
FIG. 7 illustrates an example of an UL-centric subframe, in accordance with certain aspects of the present disclosure.

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alterna- FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Long Burst Channel Design

In mobile communication systems conforming to certain wireless communications standards, such as the Long Term Evolution (LTE) standards, certain techniques may be used to increase the reliability of data transmission. For example, after a base station performs an initial transmission operation for a specific data channel, a receiver receiving the transmission attempts to demodulate the data channel during which the receiver performs a cyclic redundancy check (CRC) for the data channel. If, as a result of the check, the initial transmission is successfully demodulated, the receiver may send an acknowledgement (ACK) to the base station to acknowledge the successful demodulation. If, however, the initial transmission is not successfully demodulated, the receiver may send a non-acknowledgement (NACK) to the base station. A channel that transmits ACK/NACK is called a response or an ACK channel.

In some cases, under the LTE standards, an ACK channel may comprise two slots (i.e., one subframe) or 14 symbols, which may be used to transmit one or two bits of ACK. In some cases, when transmitting ACK channel information, a wireless device may perform frequency hopping. Frequency hopping refers to the practice of repeatedly switching frequencies within a frequency band in order to reduce interference and avoid interception.

Figure 8:
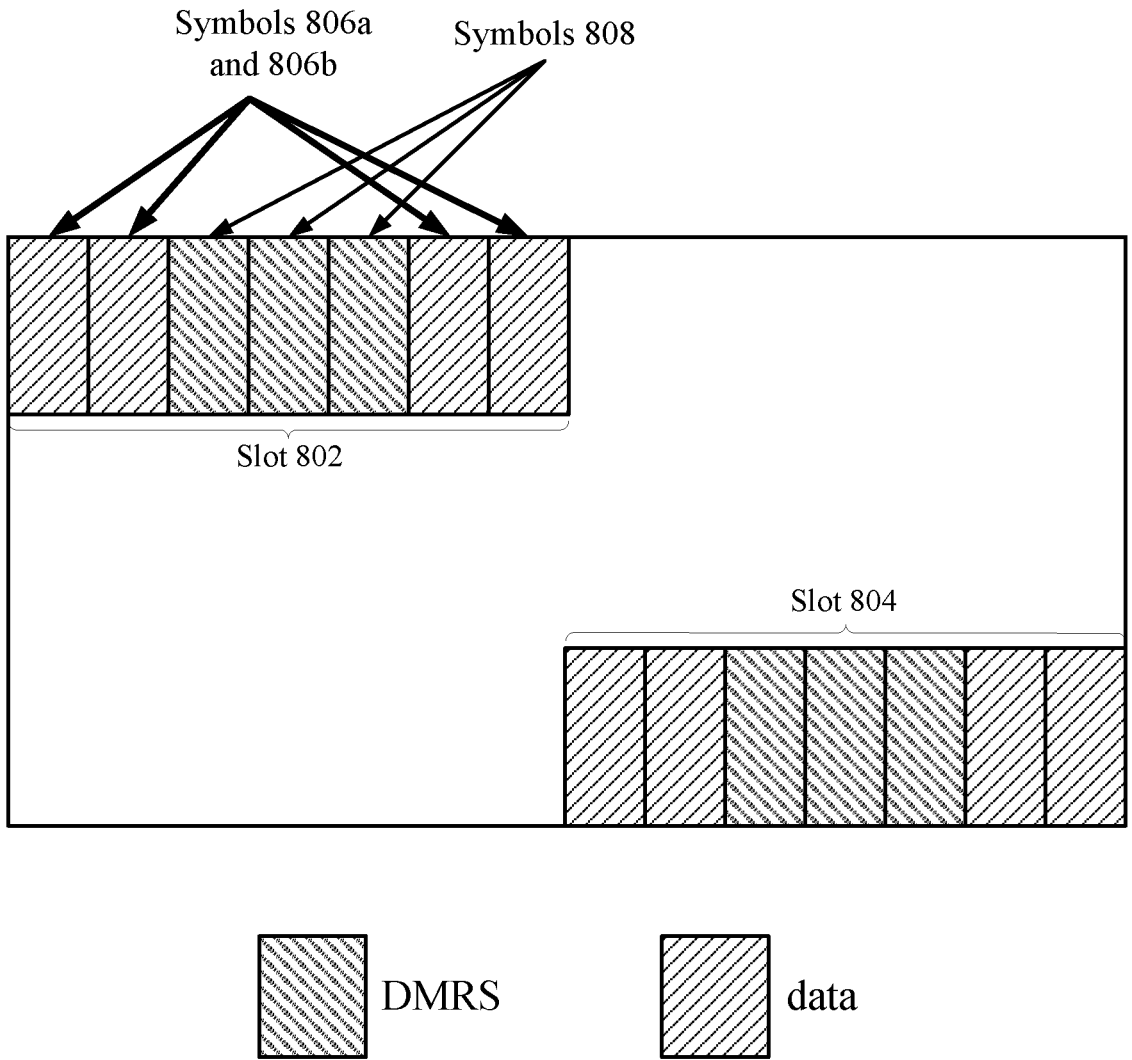
FIG. 8 illustrates an example frequency hopping when transmitting ACK channel information, in accordance with certain aspects of the present disclosure.

FIG. 8 illustrates an example of frequency hopping when transmitting ACK channel information under the LTE standards. FIG. 8 shows the frequency switching after one slot (i.e., slot 802) is transmitted, where each slot comprises 7 symbols. When transmitting ACK channel information, there are two ways of multiplexing including frequency domain multiplexing with cyclic shifts and time domain multiplexing with orthogonal cover codes (OCC). For example, under time domain multiplexing with OCC, ACK bits may be multiplexed with at least one type of reference signals (e.g., demodulation reference signals (DMRS)).

FIG. 8 shows the middle three symbols of each slot (symbols 808 of slot 802) being used for transmitting demodulation reference signals (DMRS) with Discrete Fourier Transform 3 (DFT3) spreading. In addition, in some embodiments, two data symbols (symbols 806a) may be transmitted before and two data symbols (symbols 806b) after the three DMRS symbols (symbols 808 of slot 802) using Hadamard de-spreading. In some embodiments, if the time domain symbols are repeated, as shown in FIG. 8, the Euclidian distances between different hypotheses of the information bits are not maximized.

Figure 9A:
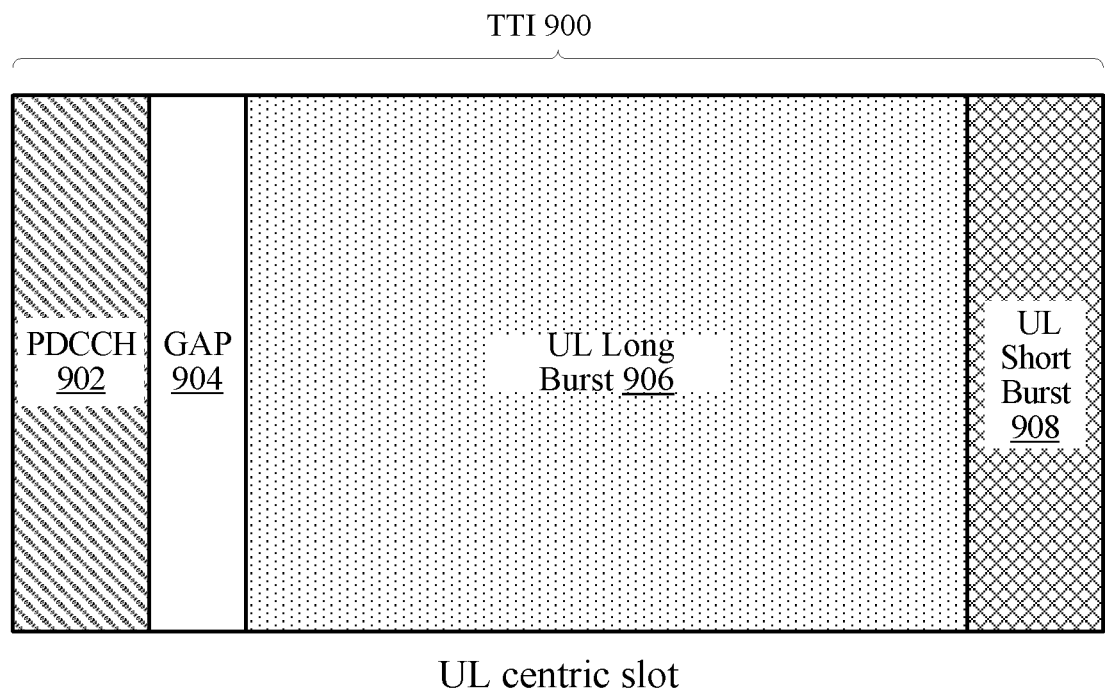
FIGS. 9a and 9b illustrate example uplink and downlink structures, respectively, in accordance with certain aspects of the present disclosure.

Under other wireless communications standards, such as NR, the ACK channel information as well as other information may be transmitted through an uplink structure shown in FIG. 9a.

FIG. 9a illustrates an example uplink structure with a transmission time interval (TTI) 900 that includes a region 906 for long uplink burst transmissions (hereinafter referred to as "UL Long Burst"). UL Long Burst 906 may transmit information such as acknowledgment (ACK), channel quality indicator (CQI), or scheduling request (SR) information.

The duration of UL Long Burst 906 may vary depending on how many symbols are used for the physical downlink control channel (PDCCH) 902, the gap 904, and the short uplink burst (shown as UL Short Burst 908), as shown in FIG. 9a. For example, UL Long Burst 906 may span a number of slots (e.g., 4), where the duration of UL Long Burst 902 in each slot may vary from 4 to 14 symbols.

Figure 9B:
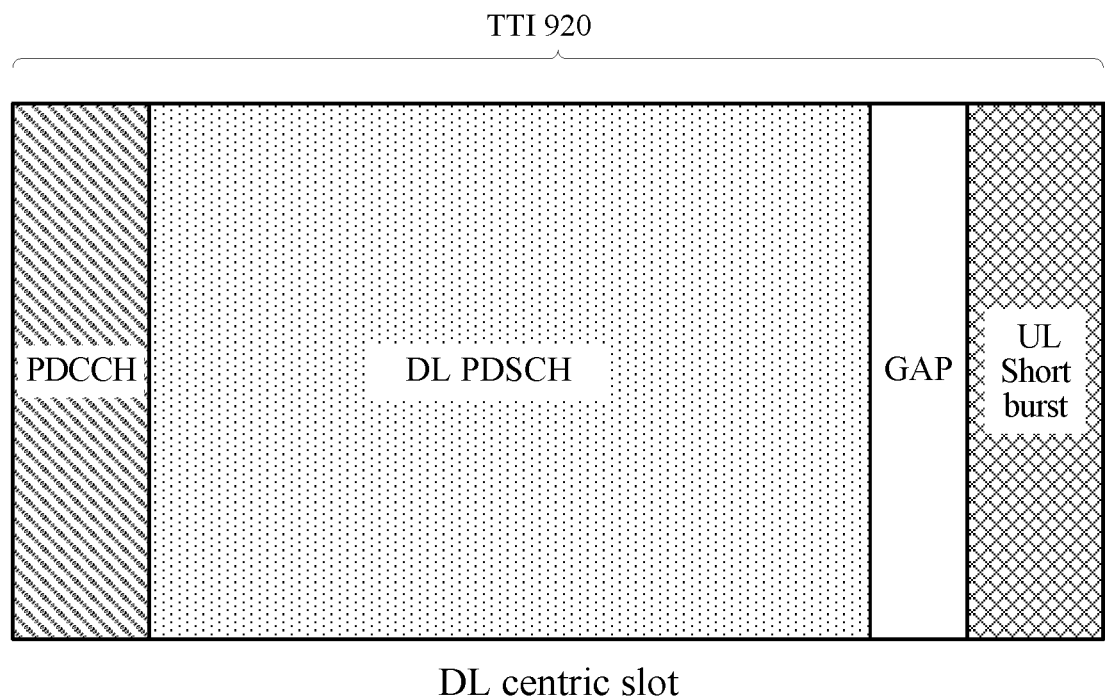

FIG. 9b also shows a downlink structure having a TTI 920 that includes PDCCH, downlink physical downlink shared channel (PDSCH), a gap, and an uplink short burst. Similar to the UL Long Burst, the duration of the DL PDSCH may also depend on the number of symbols used by the PDCCH, the gap, and the uplink short burst.

Unlike the ACK channel duration, which had a fixed duration under the LTE standards, time domain multiplexing of the ACK bits with OCC, where the duration of the UL Long Burst (e.g., UL Long Burst 906) or DL PDCCH is not fixed, may pose issues. For example, the spreading factor and OCCs may change according to different UL Long Burst durations. Furthermore, different UEs may have different UL Long Burst durations and maintaining orthogonality among UEs with different UL Long Burst durations in the same RB will be difficult. As such, under NR, if time domain multiplexing with OCC is disabled, performance may be improved compared to when the data symbols are repeated. For example, a simplex code may be used to improve the Euclidian distance between different hypotheses.

Accordingly, certain embodiments herein describe frequency hopping techniques for a long physical uplink control channel (PUCCH), which may be used to carry ACK channel information, SR, and CQI.

Figure 10:
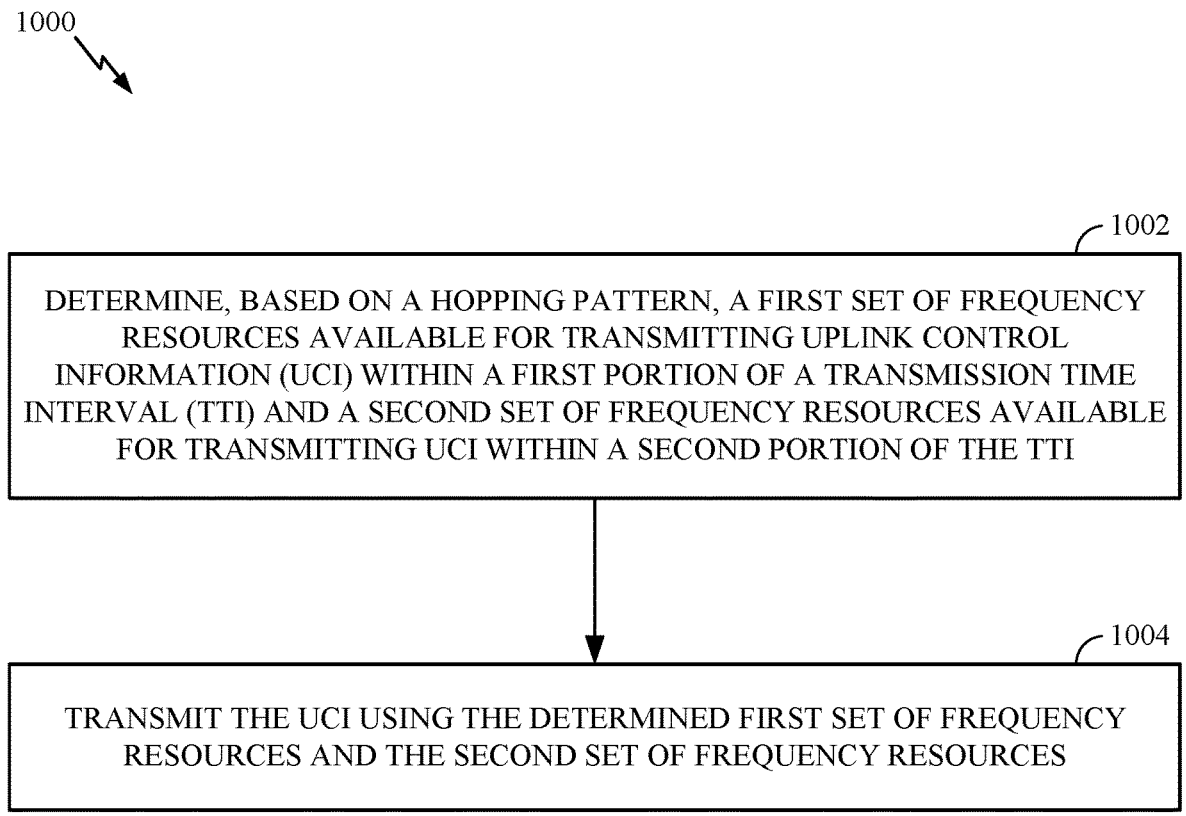
FIG. 10 illustrates example operations for wireless communications by a transmitter, according to aspects of the present disclosure.

FIG. 10 illustrates example operations 1000 for wireless communications by a wireless device, according to aspects of the present disclosure. The wireless device performing operations 1000 may be, for example, a transmitter (e.g., UE 120). Operations 1000 begin, at 1002, by determining, based on a hopping pattern, a first set of frequency resources available for transmitting uplink control information (UCI) within a first portion of a transmission time interval (TTI) and a second set of frequency resources available for transmitting UCI within a second portion of the TTI. At 1004, operations 1000 continue by transmitting the UCI using the determined first set of frequency resources and the second set of frequency resources.

Figure 11A:
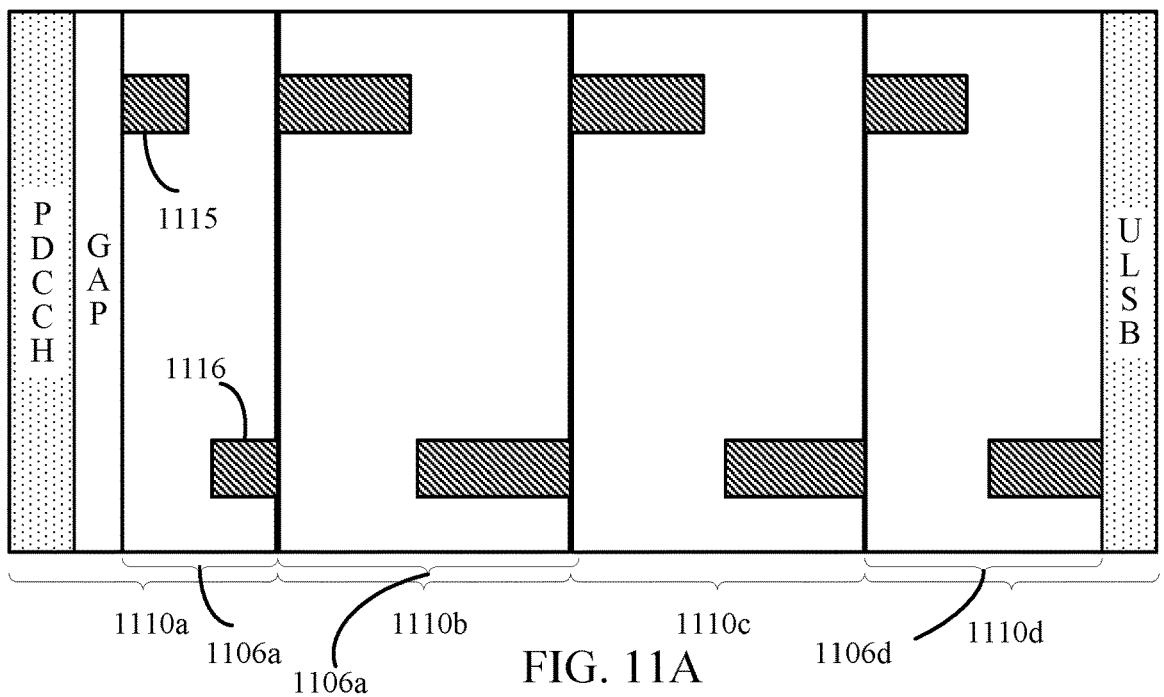
FIG. 11a illustrates an example uplink structure with a number of slots, in accordance with certain aspects of the present disclosure.

FIG. 11a illustrates an example uplink structure with a TTI 900 comprising 4 slots 1110a-1110d, where slots 1110a and 1110d comprise a lower number of symbols in their UL Long Burst regions compared to slots 1110b and 1110c at the center. As described above, the durations of the UL Long Burst regions 1106a and 1106d of slots 1110a and 1110d, respectively, depend on how many symbols are used for PDCCH, the gap, and/or the UL Short Burst in each slot.

In some embodiments, the transmission frequency may switch, according to frequency hopping techniques described herein, during each slot 1110 of the PUCCH channel of FIG. 11a. The frequency hopping techniques described in relation to FIG. 11a may be referred to as "intra-slot" hopping because, as shown in FIG. 11a, the frequency may be switched (e.g., from frequency 1115 to frequency 1116) after a certain number of symbols in each slot. In some other embodiments, the frequency hopping may be "inter-slot," meaning that the frequency hopping may occur across multiple slots (e.g., on slot boundaries). In some embodiments, only one of inter-slot or intra-slot frequency hopping may be enabled for a single transmission.

In some embodiments, when intra-slot hopping is enabled, the hopping position (i.e., the symbol at which frequency is switched) may be fixed at a particular symbol. For example, in some embodiments, the hopping position may be fixed at symbol 7, regardless of how many symbols the UL Long Burst region of each slot comprises (e.g., regardless of how many symbols are used for the PDCCH, the gap, and the UL Short Burst). For example, slot 1110a may comprise a number of symbols utilized for the transmission of the PDCCH and the gap, thereby limiting the duration of the UL Long Burst to region 1106a. In contrast, the entire duration of slot 1110b is allocated to UL Long Burst region 1106b. In embodiments where the hopping position is fixed, frequency switching may be performed at a fixed symbol in each slot regardless of the duration of the UL Long Burst region. In other words, in such embodiments, the hopping symbol may be the same in slot 1110a and 1110b.

In some embodiments, when intra-slot hopping is enabled, the hopping position may be floating. In some embodiments, the floating hopping symbol position within a slot is determined based on a number of symbols that are allocated to the UL Long Burst in the slot for transmitting UCI. For example, the frequency may be switched at the center symbol of the UL Long Burst in each slot. In such an example, if a slot comprises 12 symbols in the UL Long Burst, the hopping position may be 6. FIG. 11a provides an illustration of this example. In embodiments where the number of symbols in the UL Long Burst is odd, the frequency may switch at a symbol that is closest to the center. For example, if the UL Long Burst comprises X symbols, in some embodiments, the floating hopping symbol position may have a symbol number that is one of two integers that are the closest to a number that equals X divided by two. As an example, assuming UL Long Burst 1106a of slot 1110a comprises 11 symbols, frequency may switch at symbol 5 or symbol 6 of UL Long Burst 1106a (e.g., symbols 5 and 6 are integers that are closest to 5.5, which equals 11 divided by 2).

In some embodiments, the frequency hopping (e.g., intra-slot hopping) within the PUCCH channel may be enabled or disabled for a particular slot. For example, intra-slot hopping is enabled for slot 1110a but not slot 1110b. The enabling or disabling of frequency hopping (e.g., intra-slot hopping), in some embodiments, may be configured dynamically or semi-statically. In some embodiments, the configuration for enabling or disabling frequency hopping (e.g., intra-slot hopping) is UE-specific.

Figure 11B:
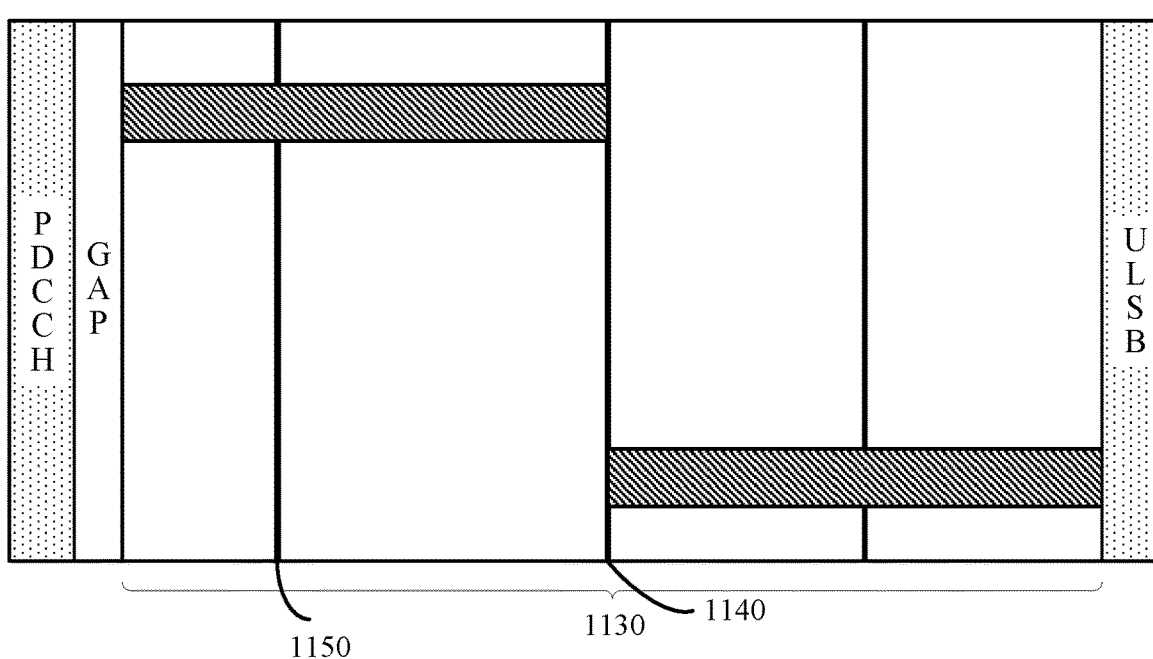
FIG. 11b illustrates an example of slot aggregation in an uplink structure with a number of slots, in accordance with certain aspects of the present disclosure.

In some embodiments, one or more slots of the TTI may be aggregated. FIG. 11b illustrates an example of a long PUCCH channel with aggregated across slots. In embodiments where slots are aggregated, intra-slot hopping may either be enabled and repeated or disabled. When intra-slot hopping is disabled, in some embodiments, hopping may occur according to one or a combination of three techniques described below.

Using the first technique, hopping may occur at the center symbol of the UL Long Burst. In some embodiments, the UL Short Burst may be included in one of the aggregated slots (not shown in FIG. 11b). In some embodiments, the number of symbols used for the UL Short Burst may not be counted as symbols in UL Long Burst when determining the center symbol of the UL Long Burst. This results in a UL Long Burst with a number of counted symbols that varies per slot. However, using the second technique, the number of symbols used for the UL Short Burst may be counted as symbols in UL Long Burst when determining the center symbol of the UL Long Burst. This results in a UL Long Burst where the number of counted symbols per slot is fixed.

In some embodiments, the DL PDCCH or gap portion may be included or present in an aggregated slot. In some embodiments, the number of symbols used for the PDCCH or gap may not be counted as symbols in UL long Burst when determining the center symbol of the UL Long Burst. This results in a UL Long Burst with a number of counted symbols that varies per slot. However, in some other embodiments, the number of symbols used for the PDCCH or gap may be counted as one of the symbols in UL Long Burst when determining the center symbol of the UL Long Burst. This results in a UL Long Burst where the number of counted symbols per slot is fixed. FIG. 11b illustrates an example of where frequency hopping occurs at the center symbol (e.g., boundary of the center symbol is shown as 1140) of the UL Long Burst 1130 when the ULSB, gap, and PDCCH symbols are not counted as symbols of the UL Long Burst 1130.

Using a third technique, when intra-slot hopping is disabled and one or more slots of the TTI are aggregated, instead of hopping at the center symbol of the UL Long Burst, hopping may occur at the slot boundaries (e.g., inter-slot hopping) or half-slot boundaries. For example, in FIG. 11b, hopping may occur at slot boundary 1150. In one example, there may be frequency hopping on every slot boundary following the same pattern. For example, one slot may use the first frequency, the second slot may use the second frequency, and then the third slot may also use the first frequency, and the forth slot may also use the second frequency, and so on. In another example, there may be only one frequency hopping over the multi-slot duration.

In some embodiments, if hopping occurs at the slot boundaries, the number of slots per hop may be uneven between the two hops when the number of slots is odd. If hopping occurs at the half-slot boundaries, the number of slots per hop may be even between the two hops. In one example, the frequency hopping may occur at the center symbol of the center slot when the number of slots is odd.

Figure 12:
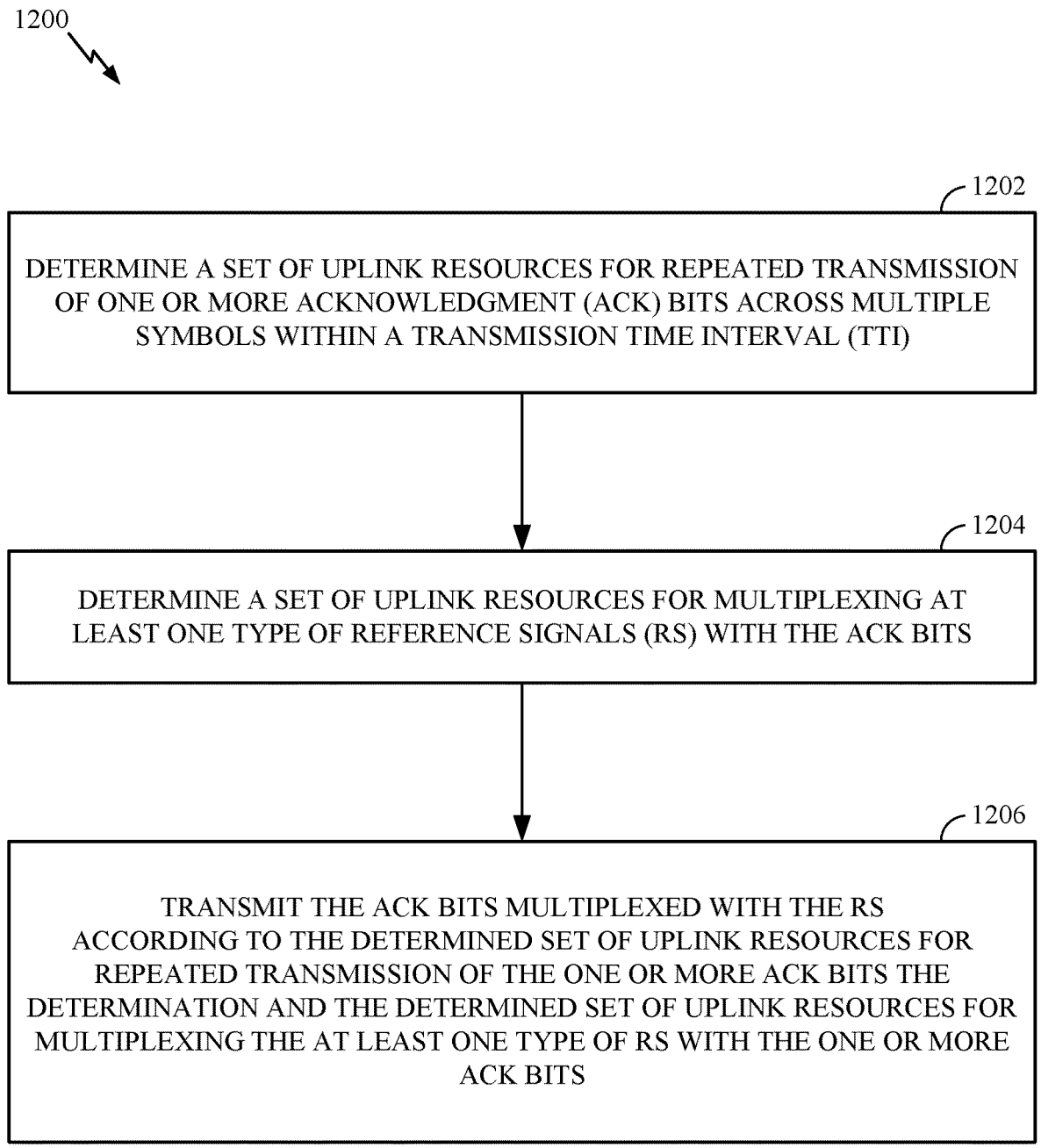
FIG. 12 illustrates example operations for wireless communications by a user equipment, according to aspects of the present disclosure.

FIG. 12 illustrates example operations 1200 for wireless communications by a wireless device, according to aspects of the present disclosure. The wireless device performing operations 1200 may be, for example, a user equipment. Operations 1200 begin, at 1202, by determining a set of uplink resources for repeated transmission of one or more acknowledgment (ACK) bits across multiple symbols within a transmission time interval (TTI). At 1204, operations 1200 continue by determining a set of uplink resources for multiplexing at least one type of reference signals (RS) with the one or more ACK bits. At 1206, operations 1200 continue by transmitting the one or more ACK bits multiplexed with the RS according to the determined set of uplink resources for repeated transmission of the one or more ACK bits and the determined set of uplink resources for multiplexing the at least one type of RS with the one or more ACK bits.

Figure 13:
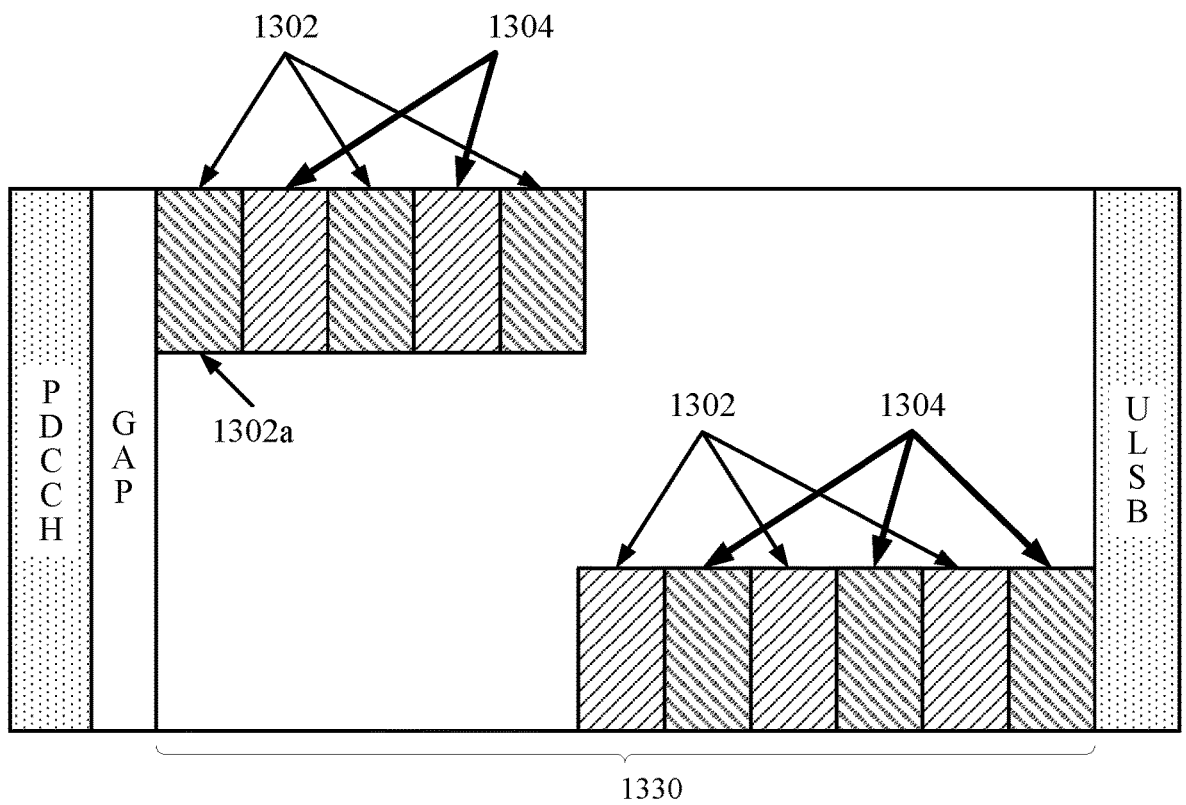
FIG. 13 illustrates an example of multiplexing acknowledge bits with reference signals, according to aspects of the present disclosure.

In some embodiments, as described above, ACK bits may be transmitted in the UL Long Burst under certain wireless communications standards, such as NR. In some embodiments, the ACK may comprise a number of bits including one or two bits, etc. FIG. 13 illustrates an example design for transmitting ACK bits in symbols 1304 in the UL Long Burst 1330. In the embodiments of FIG. 13, time domain multiplexing with OCC may be used in combination with repeating ACK bits. As shown in FIG. 13, the UL Long Burst 1330 comprises 11 symbols, where ACK bits are multiplexed with reference signals (e.g., DMRS).

FIG. 13 shows DMRS being transmitted with every other symbol 1302 starting with the first symbol 1302a. The other five symbols 1304 are, however, data symbols used for transmitting ACK bits. Accordingly, the DMRS and ACK bits are transmitted in altering symbols. In some embodiments, an ACK may be 1 bit and the same bit may be transmitted with every data symbol such that the bit sequence may be: b0, b0, b0, b0, and b0. The 1 bit may be modulated with binary phase shift keying (BPSK). In some other embodiments, ACK bits may be 2 bits and the same two bits may be transmitted with every data symbol such that the bit sequence may be: b0 b1, b0 b1, b0 b1, b0 b1, and b0 b1. Further, the 2 bits may be modulated using Quadrature Phase Shift Keying (QPSK). In some embodiments, the modulated ACK bits of one or more UE are sent using frequency domain multiplexing with different cyclic shifts corresponding to the one or more UEs. In some other embodiments, the ACK bits may also be sent using time domain multiplexing with OCC, in which case the spreading factor and OCC may be adapted to the duration of the long uplink burst (e.g., for the transmission of, for example, the ACK bits multiplexed with reference signals).

In some embodiments, instead of using time domain multiplexing with OCC in combination with repeating the same ACK bits in the data symbols, simplex coding may be used for the encoding of ACK bits. In some embodiments, a 2-bit ACK (e.g., b0 b1) may be encoded with a simplex code, resulting in at least one additional bit. As an example, a 2-bit ACK (e.g., b0 b1) may be encoded with a simplex code resulting in three bits (e.g., b0 b1 b2). The three encoded bits may be repeated. Accordingly, a subset of the encoded bits is transmitted in each data symbol using QPSK modulation. For example, the resulting three bits may be repeated serially, where two bits may be transmitted with each data symbol. As an example, the first data symbol may carry b0 b1, the second data symbol may carry b2 b0, the third data symbol may carry b1 b2, and the pattern keeps repeating.

FIG. 13 shows one example of when a subset of the encoded bits is transmitted in each alternating symbol using QPSK modulation. The resulting data symbols are repeated every 3 data symbols (e.g., symbols 1304). Time domain OCC may be applied to the repeated data symbols carrying the same bits. For example, OCC may be applied to all data symbols carrying b0 b1. Similarly, OCC may be applied to all data symbols that carry either b2 b0, or b1 b2.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    determining a first set of uplink resources for repeated transmission of one or more acknowledgment (ACK) bits across multiple symbols within a transmission time interval (TTI);
    determining a second set of uplink resources for multiplexing at least demodulation reference signals (DMRS) with the one or more ACK bits; and
    transmitting the one or more ACK bits multiplexed with the DMRS in alternating symbols using the first set of uplink resources and the second set of uplink resources, wherein the one or more ACK bits are multiplexed with the DMRS based on the first set of uplink resources and the second set of uplink resources, and wherein:
    the one or more ACK bits are sent with time domain multiplexing using orthogonal cover codes (OCCs), and
    the one or more ACK bits being multiplexed with the DMRS based on the first set of uplink resources and the second set of uplink resources comprise the OCCs being based on a duration of the determined uplink resources including the first set of uplink resources and the second set of uplink resources.

2. The method of claim 1, wherein determining the first set of uplink resources and determining the second set of uplink resources are based on whether intra-slot frequency hopping is enabled at the UE.

3. The method of claim 1, wherein the one or more ACK bits are modulated using at least one of binary phase-shift keying (BPSK) or quadrature phase-shift keying (QPSK) modulation.

4. The method of claim 1, wherein the one or more ACK bits are frequency domain multiplexed with one or more ACK bits of one or more other UEs using different cyclic shifts corresponding to different UEs including the UE and the one or more other UEs.

5. The method of claim 1, wherein a duration of the OCCs is based on whether intra-slot hopping is enabled at the UE.

6. The method of claim 1, further comprising:
    prior to transmitting the one or more ACK bits multiplexed with the DMRS, encoding the one or more ACK bits with a simplex code resulting in a plurality of encoded ACK bits including at least one more bit than the one or more ACK bits prior to encoding, wherein transmitting the one or more ACK bits comprises transmitting the plurality of encoded ACK bits, and wherein repeated transmission of the one or more ACK bits comprises repeated transmission of different subsets of the plurality of encoded ACK bits using Quadrature Phase Shift Keying (QPSK) modulation.

7. An apparatus, comprising:
    a non-transitory memory comprising executable instructions; and
    one or more processors in data communication with the memory and configured to execute the instructions to cause the apparatus to:
    determine a first set of uplink resources for repeated transmission of one or more acknowledgment (ACK) bits across multiple symbols within a transmission time interval (TTI);
    determine a second set of uplink resources for multiplexing at least demodulation reference signals (DMRS) with the one or more ACK bits; and
    transmit the one or more ACK bits multiplexed with the DMRS in alternating symbols using the first set of uplink resources and the second set of uplink resources, wherein the one or more ACK bits are multiplexed with the DMRS based on the first set of uplink resources and the second set of uplink resources, and wherein:
    the one or more ACK bits are sent with time domain multiplexing using orthogonal cover codes (OCCs), and
    the one or more ACK bits being multiplexed with the DMRS based on the first set of uplink resources and the second set of uplink resources comprise the OCCs being based on a duration of the determined uplink resources including the first set of uplink resources and the second set of uplink resources.

8. The apparatus of claim 7, wherein the processor being configured to execute the instructions to cause the apparatus to determine the first set of uplink resources and the second set of uplink resources comprises the processor being configured to execute the instructions to cause the apparatus to determine the first set of uplink resources and the second set of uplink resources based on whether intra-slot frequency hopping is enabled at the apparatus.

9. The apparatus of claim 7, wherein the one or more ACK bits are modulated using at least one of binary phase-shift keying (BPSK) or quadrature phase-shift keying (QPSK) modulation.

10. The apparatus of claim 7, wherein the one or more ACK bits are frequency domain multiplexed with one or more ACK bits of one or more other UEs using different cyclic shifts corresponding to different UEs including the UE and the one or more other UEs.

11. The apparatus of claim 7, wherein a duration of the OCCs is based on whether intra-slot hopping is enabled at the apparatus.

12. The apparatus of claim 7, wherein the processor is configured to cause the apparatus to, prior to transmitting the one or more ACK bits multiplexed with the DMRS, encode the one or more ACK bits with a simplex code resulting in a plurality of encoded ACK bits including at least one more bit than the one or more ACK bits prior to encoding, wherein the processor being configured to cause the apparatus to transmit the one or more ACK bits comprises the processor being configured to cause the apparatus to transmit the plurality of encoded ACK bits, and wherein repeated transmission of the one or more ACK bits comprises repeated transmission of different subsets of the plurality of encoded ACK bits using Quadrature Phase Shift Keying (QPSK) modulation.

13. An apparatus, comprising:
means for determining a first set of uplink resources for repeated transmission of one or more acknowledgment (ACK) bits across multiple symbols within a transmission time interval (TTI);
means for determining a second set of uplink resources for multiplexing at least demodulation reference signals (DMRS) with the one or more ACK bits; and
means for transmitting the one or more ACK bits multiplexed with the DMRS in alternating symbols using the first set of uplink resources and the second set of uplink resources, wherein the one or more ACK bits are multiplexed with the DMRS based on the first set of uplink resources and the second set of uplink resources, and wherein:
the one or more ACK bits are sent with time domain multiplexing using orthogonal cover codes (OCCs), and
the one or more ACK bits being multiplexed with the DMRS based on the first set of uplink resources and the second set of uplink resources comprise the OCCs being based on a duration of the determined uplink resources including the first set of uplink resources and the second set of uplink resources.

14. The apparatus of claim 13, wherein the means for determining the first set of uplink resources and the means for determining the second set of uplink resources are configured to determine the first set of uplink resources and the second set of uplink resources based on whether intra-slot frequency hopping is enabled at the apparatus.

15. The apparatus of claim 13, wherein the one or more ACK bits are modulated using at least one of binary phase-shift keying (BPSK) or quadrature phase-shift keying (QPSK) modulation.

16. The apparatus of claim 13, wherein the one or more ACK bits are frequency domain multiplexed with one or more ACK bits of one or more other UEs using different cyclic shifts corresponding to different UEs including the UE and the one or more other UEs.

17. The apparatus of claim 13, wherein a duration of the OCCs is based on whether intra-slot hopping is enabled at the apparatus.

18. The apparatus of claim 13, further comprising means for, prior to transmitting of the one or more ACK bits multiplexed with the DMRS, encoding the one or more ACK bits with a simplex code resulting in a plurality of encoded ACK bits including at least one more bit than the one or more ACK bits prior to encoding, wherein the means for transmitting the one or more ACK bits comprises means for transmitting the plurality of encoded ACK bits, and wherein repeated transmission of the one or more ACK bits comprises repeated transmission of different subsets of the plurality of encoded ACK bits using Quadrature Phase Shift Keying (QPSK) modulation.

19. A non-transitory computer readable medium having instructions stored thereon that, when executed by a user equipment (UE), cause the UE to perform a method comprising:
determining a first set of uplink resources for repeated transmission of one or more acknowledgment (ACK) bits across multiple symbols within a transmission time interval (TTI);
determining a second set of uplink resources for multiplexing at least demodulation reference signals (DMRS) with the one or more ACK bits; and
transmitting the one or more ACK bits multiplexed with the DMRS in alternating symbols using the first set of uplink resources and the second set of uplink resources, wherein the one or more ACK bits are multiplexed with the DMRS based on the first set of uplink resources and the second set of uplink resources, and wherein:
the one or more ACK bits are sent with time domain multiplexing using orthogonal cover codes (OCCs), and
the one or more ACK bits being multiplexed with the DMRS based on the first set of uplink resources and the second set of uplink resources comprise the OCCs being based on a duration of the determined uplink resources including the first set of uplink resources and the second set of uplink resources.

20. The non-transitory computer readable medium of claim 19, wherein determining the first set of uplink resources and determining the second set of uplink resources are based on whether intra-slot frequency hopping is enabled at the UE.

21. The non-transitory computer readable medium of claim 19, wherein the one or more ACK bits are modulated using at least one of binary phase-shift keying (BPSK) or quadrature phase-shift keying (QPSK) modulation.

22. The non-transitory computer readable medium of claim 19, wherein the one or more ACK bits are frequency domain multiplexed with one or more ACK bits of one or more other UEs using different cyclic shifts corresponding to different UEs including the UE and the one or more other UEs.

23. The non-transitory computer readable medium of claim 19, wherein a duration of the OCCs is based on whether intra-slot hopping is enabled at the UE.

24. The non-transitory computer readable medium of claim 19, wherein the method further comprises:
   prior to transmitting the one or more ACK bits multiplexed with the DMRS, encoding the one or more ACK bits with a simplex code resulting in a plurality of encoded ACK bits including at least one more bit than the one or more ACK bits prior to encoding, wherein transmitting the one or more ACK bits comprises transmitting the plurality of encoded ACK bits, and wherein repeated transmission of the one or more ACK bits comprises repeated transmission of different subsets of the plurality of encoded ACK bits using Quadrature Phase Shift Keying (QPSK) modulation.

* * * * *

UNITED STATES PATENT AND TRADEMARK OFFICE
CERTIFICATE OF CORRECTION

PATENT NO. : 11,924,838 B2
APPLICATION NO. : 17/014769
DATED : March 5, 2024
INVENTOR(S) : Renqiu Wang et al.

It is certified that error appears in the above-identified patent and that said Letters Patent is hereby corrected as shown below:

In the Claims

In Column 22, Line 3, Claim 1, cancel the text "sent" and insert --transmitted-- between are and with;

In Column 22, Line 8, Claim 1, insert --s-- at the end of the word comprise;

In Column 22, Line 59, Claim 7, cancel the text "sent" and insert --transmitted-- between are and with;

In Column 22, Line 64, Claim 7, insert --s-- at the end of the word comprise;

In Column 23, Line 52, Claim 13, cancel the text "sent" and insert --transmitted-- between are and with;

In Column 23, Line 57, Claim 13, insert --s-- at the end of the word comprise;

In Column 24, Line 44, Claim 19, cancel the text "sent" and insert --transmitted-- between are and with;

In Column 24, Line 49, Claim 19, insert --s-- at the end of the word comprise.

Signed and Sealed this
Twentieth Day of May, 2025

Coke Morgan Stewart
*Acting Director of the United States Patent and Trademark Office*